United States Patent
Siddabathula et al.

(10) Patent No.: US 10,929,403 B2
(45) Date of Patent: Feb. 23, 2021

(54) DYNAMIC DATA THREADING SYSTEM

(71) Applicant: AT&T Intellectual Property I, L.P., Atlanta, GA (US)

(72) Inventors: Muralidhar Siddabathula, Holmdel, NJ (US); Sreelatha Bandla, Marlboro, NJ (US); David Lu, Irving, TX (US); Kenneth Williams, Manasquan, NJ (US); Robert Best, Jr., Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 216 days.

(21) Appl. No.: 15/722,151

(22) Filed: Oct. 2, 2017

(65) Prior Publication Data

US 2019/0102434 A1    Apr. 4, 2019

(51) Int. Cl.
| | |
|---|---|
| *G06F 16/00* | (2019.01) |
| *G06F 16/2455* | (2019.01) |
| *G06F 9/30* | (2018.01) |
| *G06N 20/00* | (2019.01) |
| *G06F 16/242* | (2019.01) |
| *G06F 16/2453* | (2019.01) |

(52) U.S. Cl.
CPC ...... *G06F 16/24568* (2019.01); *G06F 9/3009* (2013.01); *G06F 16/2425* (2019.01); *G06F 16/2445* (2019.01); *G06F 16/24549* (2019.01); *G06N 20/00* (2019.01)

(58) Field of Classification Search
CPC ................................................ G06F 16/24568
USPC .......................................... 707/769, 722, 707
See application file for complete search history.

(56) References Cited

U.S. PATENT DOCUMENTS

| | | | |
|---|---|---|---|
| 7,305,381 B1 * | 12/2007 | Poppink | G06Q 10/107 |
| 8,150,674 B2 | 4/2012 | Anand et al. | |
| 8,539,496 B1 | 9/2013 | Anand et al. | |
| 8,645,361 B2 * | 2/2014 | Poznanski | G06F 16/951 |
| | | | 707/722 |
| 8,849,894 B2 | 9/2014 | Mueller et al. | |
| 9,021,438 B2 | 4/2015 | Dayan | |
| 9,195,726 B2 | 11/2015 | Bharadwaj et al. | |
| 9,253,306 B2 | 2/2016 | Mohler | |
| 9,324,033 B2 | 4/2016 | Boldyrev et al. | |
| 9,417,931 B2 | 8/2016 | Krishnaswamy et al. | |
| 2005/0044076 A1 * | 2/2005 | Wu | G06F 16/9535 |
| 2005/0251527 A1 | 11/2005 | Phillips et al. | |
| 2008/0270363 A1 | 10/2008 | Hunt et al. | |
| 2011/0126197 A1 | 5/2011 | Larsen et al. | |
| 2016/0147888 A1 * | 5/2016 | Nguyen | G06F 16/2455 |
| | | | 707/707 |

* cited by examiner

*Primary Examiner* — Chelcie L Daye
(74) *Attorney, Agent, or Firm* — Hartman & Citrin LLC

(57) ABSTRACT

Concepts and technologies disclosed herein are directed to a dynamic data threading ("DDT") system. According one aspect of the concepts and technologies disclosed herein, the DDT system can query a source of a plurality of disparate sources and receive results from the source. The DDT system can determine, based upon the results, whether a further query is needed. The DDT system, in response to determining that the further query is needed, the DDT system can query a further source of the plurality of disparate sources based, at least in part, upon the results received from the source, and can receive further results from the further source.

20 Claims, 7 Drawing Sheets

DYNAMIC DATA THREADING SYSTEM

BACKGROUND

General data query tools, such as extensible markup language ("XML") SPY, TOAD, SOAP UI, and the like, enable users to execute and render data queries and to obtain results as atomic functions. Most of these tools can export data in multiple formats and some allow scheduling for data extraction. However, all of these tools require custom coding to support specific data query functions. Existing data query tools are not cloud-deployable, not self-serviceable, do not provide fine grain access control, and do not have data threading capabilities. Moreover, existing data query tools expose users and their computers to data security issues due, at least in part, to the lack of parallel execution and interruption capabilities and because of the inability to store generic metadata for data query sequences.

SUMMARY

Concepts and technologies disclosed herein are directed to a dynamic data threading ("DDT") system. According to one aspect of the concepts and technologies disclosed herein, the DDT system can query a source of a plurality of disparate sources and receive results from the source. In some embodiments, the plurality of disparate sources includes one or more databases, one or more APIs, and one or more web services. The DDT system can determine, based upon the results, whether a further query is needed. The DDT system, in response to determining that the further query is needed, can query a further source of the plurality of disparate sources based, at least in part, upon the results received from the source, and can receive further results from the further source.

In some embodiments, the DDT system can determine, based upon the further results, whether a still further query is needed. In response to determining that the still further query is needed, the DDT system can query a still further source of the plurality of disparate sources based, at least in part, upon the further results received from the further source, and can receive still further results from the still further source. In some embodiments, the source includes a database, the further source includes an application programming interface ("API"), and the still further source includes a web service.

In some embodiments, the further results include an output. The DDT system can send the output to an output destination. In some embodiments, the output destination is an artificial intelligence system. In some embodiments, the output destination is a machine learning system. The output can be in a plurality of formats utilized by the output destination or multiple output destinations.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
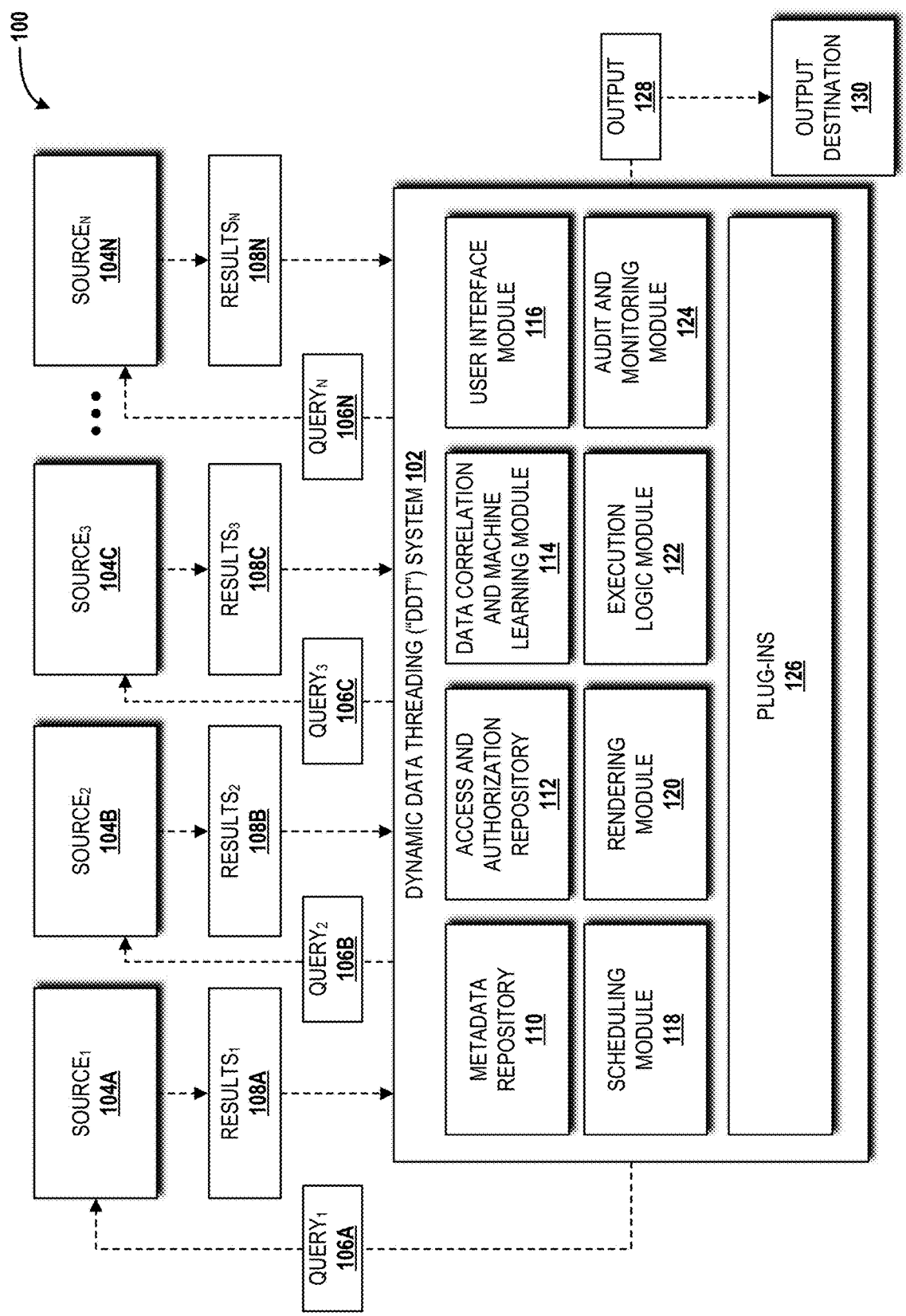
FIG. 1 is a block diagram illustrating an illustrative operating environment capable of implementing aspects of the concepts and technologies disclosed herein.

The concepts and technologies disclosed herein are directed to a dynamic data threading ("DDT") system. The DDT system can utilize web technologies and tools to automate the creation of semantic data threads. This automation provides an intuitive and self-learning system that allows authorized users to define data sources of various types (e.g., databases, XML/REST/SOAP-based application programming interfaces, web services, files, etc.) and to define metadata to connect different disparate data sources for interactions and other actions to create semantic data paths. Results of the semantic data paths can be re-used, scheduled, or run on-demand. The DDT system also supports fine-grain access controls for data access, whereby group privileges and individual user access privileges can be managed for all aspects of a given semantic data path. The DDT system can be fully self-serviceable and can be cloud-enabled. The DDT system has many use cases to stitch together data dynamically and to provide on-demand access across disparate systems, which is not possible today. This results in a huge benefit for any information technology ("IT") software development lifecycle and post-production systems. Moreover, the concepts and technologies disclosed herein are applicable to extreme automation scenarios in which artificial intelligence and/or multilingual agents can automatically traverse multiple process boundaries to collect semantic data and to issue appropriate action(s) in response.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for a DDT system will be described.

Turning now to FIG. 1, an operating environment 100 in which aspects of the concepts and technologies disclosed herein can be implemented will be described, according to an embodiment. The illustrated operating environment 100 includes a DDT system 102, a plurality of data sources 104A-104N (hereinafter referred to in the singular as "data source 104" or collectively as "data sources 104"), a plurality of data queries 106A-106N (hereinafter referred to in the singular as "query 106" or collectively as "queries 106"), and a plurality of query results (hereinafter referred to in the singular as "result 108" or collectively as "results 108").

The DDT system 102 is an automation tool that creates semantic data threads through a plurality of disparate data sources. More particularly, the DDT system 102 can connect two or more of the data sources 104 in sequence such that one or more data sources in the sequence can utilize output from a previous data source as input. The end result of a semantic data thread is an output based upon all data sources within a given sequence. The DDT system 102 can reuse semantic data threads to achieve known output types. The DDT system 102 includes a definition of a coherent set of semantic data threads through the data sources 104. Semantic data threads are parameterized for repeatability to obtain results in a known output type. Parameterization allows for the dynamic substitution of the parameters leading to data-driven semantic data threads. Moreover, semantic data threads are executable on-demand or can be scheduled as part of batch mode execution operation.

The DDT system 102 enables savings in time and cost for any IT project involved in gathering data from varied systems. The DDT system 102 helps in every step of the software development life cycle. For example, during the requirements phase of the software development lifecycle, the DDT system 102 can verify existing fields available from interfacing applications by prototyping a data orchestration spanning multiple dependent application interfaces/data exchanges. In this manner, the DDT system 102 can eliminate developer requirements to review of application interface documentation to ensure all application interface/data exchanges are operating correctly. During the development and testing phase of the software development lifecycle, the DDT system 102 can perform end-to-end testing of new software using previously-defined semantic data threads. In this manner, issues with API responses can be eliminated without looking through multiple application logs or setting up an environment which attempts to recreate the issues. During the post-production phase of the software development cycle, the DDT system 102 helps with debugging production issues related to API interactions in a more timely fashion, thereby eliminating the need to review application logs.

The metadata repository 110 can include a generic data model to store source data connection information, execution definitions, sequences of steps and interconnecting fields, preferences, and the like. The DDT system 102 includes a metadata repository 110. The metadata repository 110 can store metadata definitions, which can include data structures to store user identifier (user ID), groups, access levels, database agnostic parameterized queries, application programming interfaces ("APIs"), agnostic API information, user preferences, scheduling information, and other data that can be utilized by the DDT system 102. A metadata definition for a data store can include facility to receive input at runtime as well as a previous query. An example metadata definition is provided below.

```
<database access URL, credentials>
<database_query>
<select *... where table.col = <?substitute attribute>...>
```

Substitution attributes allow both user execution of single step with prompted values and sequential mode run with values substituted from execution of a previous step.

The DDT system 102 also includes an access and authorization repository 112. The access and authorization repository 112 can include policies for administrators, users, user groups, access control lists, user creation, user-to-group assignments, group-to-access control lists, and the like to enable fine-grain access controls to the DDT system 102. The access and authorization repository 112 can store user access credentials such as user names/IDs and passwords.

The DDT system 102 also includes a data correlation and machine learning module 114. The data correlation and machine learning module 114 enables optimal execution of the data queries 106. Optimal execution will eliminate multiple hops when machine learning suggests alternative paths. Different query parameters and/or query sequences may result in efficient execution and performance. The data queries 106 can include one or more database queries, one or more application programming interface ("API") calls, one or more web service calls, the like, and/or some combination thereof. More particularly, the data queries 106 can be or can include structured query language ("SQL") queries, and the API calls can be or can include RESTful API calls and/or common services interface ("CSI") API calls, combinations thereof, and/or the like. The data correlation and machine learning module 114 can cache execution results, apply machine learning algorithms to provide input to an execution logic module 122 (described below) and an audit and monitoring module 124 (also described below). The data correlation and machine learning module 114 can store and maintain prediction, ranking, and/or probability calculations for a given domain.

The DDT system 102 also includes a user interface module 116. The user interface module 116, in some embodiments, provides a native user interface for input to the DDT system 102 or any module or combination of modules thereof. In other embodiments, the user interface module 116 provides a web-based user interface for input to the DDT system 102 or any module or combination of modules thereof. For example, in a healthcare use case, a web-based interface can be provided through which data sources can be defined, such as data sources related to patient history from labs, primary care providers, and hospital databases. As another example, API access to social media websites, such as FACEBOOK and TWITTER, and API access to browsing history can be used to provide targeted advertisements to consumers.

The user interface module 116 can present a user interface through which users can provide their credentials, such as user name/ID and password. The DDT system 102 uses the credentials to determine whether a user is authorized to access an application by querying the access and authorization repository 112 using the user name/ID and password combination provided by the user. The user interface module 116 also renders menu options based on an authorized user's role and the group to which the user belongs, as well as access privileges with which the user is associated.

The DDT system 102 also includes a scheduling module 118. The scheduling module 118 is responsible for scheduling batch execution of data threads. Batch execution using the DDT system 102 increases efficiency over prior methods (i.e., no semantic data threads) and batch execution alone. Batch execution allows for proactive finding of anomalies in an orchestration driven by data correlation and machine learning versus traditional piece-wise segmentation. An examples of this is in end-to-end testing execution across different domains.

The DDT system 102 also includes a rendering module 120. The rendering module 120 can be implemented as a plug-in with predefined formats such as PDF, CSV, and JSON, microservices that an administrator can configure, and the like. The rendering module 120 includes code and logic to enable the DDT system 102 to output formats associated with databases, applications, files, email, documents, and the like. In some embodiments, the rendering module 120 can query an output preference for a thread set forth at the time of configuration and intake a result set from each step and render in various formats. If the output preference is PDF, then the results are output in PDF; and if the preference is a spreadsheet format, then the results for each step can be provided as a tab within the spreadsheet; if the preference is XML, then the results for each step can be provided in an XML structure with each step defined as a parent tag and a results set as tag name/value.

The DDT system 102 also includes an execution logic module 122. The execution logic module 122 enables optimal execution using source data and interface factors, such as parallel execution versus sequential execution, throttling, load and soak factors, and the like. An example of how the execution logic module 122 can optimize execution is in customer invoice generation, which includes multiple steps of collecting customer usage information for different services, credits and debits, discounts and then generating an invoice. This sequence of steps can be executed in parallel based upon the number of customers and the services to which the customer has subscribed.

The execution logic module 122 can perform a pre-scan sequence of queries to the data sources 104. For each of the data sources 104, the execution logic module 122 can verify connectivity and privileges to specific objects referred to in the queries 106. The execution logic module 122 can identify substitution dependencies between statements and candidates for parallel execution. If a step results in n records, then the next step in the sequence can be run in parallel with n threads. This level of parallel execution can lead to exhaustion of computing and storage resources quickly if each step in multi-step sequence results in multiple result sets. The execution logic module 122 can provide optimization techniques using results from the data correlation and machine learning module 114 at each step to reduce results to be used for execution of the next step. Optimization also includes use of cached data to reduce processing time and improve performance.

The DDT system 102 also includes an audit and monitoring module 124. The audit and monitoring module 124 can create audit logs for operations performed by the DDT system 102. The audit logs can be used to diagnose and respond to security threats and/or to improve functionality of the DDT system 102 through learning processes.

The DDT system 102 also includes one or more plug-ins 126. The plug-ins 126 can include any plug-ins needed by the DDT system 102 to enable communication with the sources 104. Although the term "plug-in" is used herein, the DDT system 102 can include other software, including stand-alone software, software extensions, a combination thereof, and/or the like, to implement the functionality of the plug-ins 126.

Based upon at least a portion of the results 108 (e.g., the results 108N in the illustrated example), the DDT system 102 can generate output 128 directed to an output destination 130. The output 128 can include one or more information units directed to the output destination 130, wherein the output destination 130 is or includes one or more humans, one or more other systems, one or more processes, one or more intelligent agents (e.g., artificial intelligence and/or machine learning), or some combination thereof.

Figure 7:
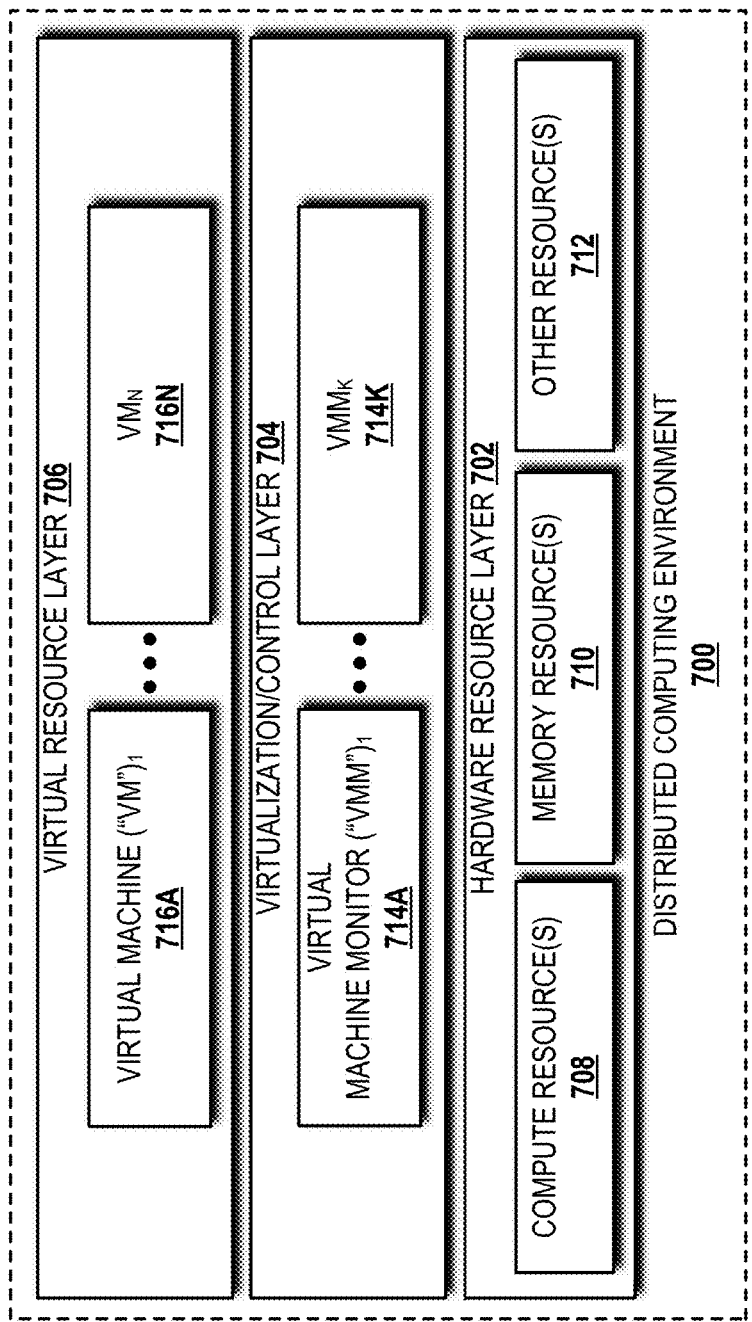
FIG. 7 is a block diagram illustrating an example distributed computing environment and components thereof capable of implementing aspects of the embodiments presented herein.

According to various embodiments, the functionality of the DDT system 102 may be provided by one or more mobile telephones, smartphones, tablet computers, slate computers, smart watches, smart glasses, other wearable devices, other smart devices, Internet of Things ("IoT") devices, security devices, media playback devices, televisions, set-top devices, navigation devices, connected cars, laptop computers, notebook computers, ultrabook computers, netbook computers, server computers, computers of other form factors, computing devices of other form factors, other computing systems, other computing devices, and/or the like. It should be understood that the functionality of the DDT system 102 can be provided by a single device, by two or more similar devices, and/or by two or more dissimilar devices. Moreover, the functionality of the DDT system 102 can be provided via a distributed computing environment as best shown in FIG. 7.

Although only one DDT system 102, four sources 104, four queries 106, four results 108, one metadata repository 110, one access and authorization repository 112, one data correlation and machine learning module 114, one user interface module 116, one scheduling module 118, one rendering module 120, one execution logic 122, one audit and monitoring module 124, one output 128, and one output destination 130 are shown in the illustrated operating environment 100, a different number of any of these elements or is contemplated. As such, the illustrated embodiment should not be construed as being limiting in any way.

Figure 2:
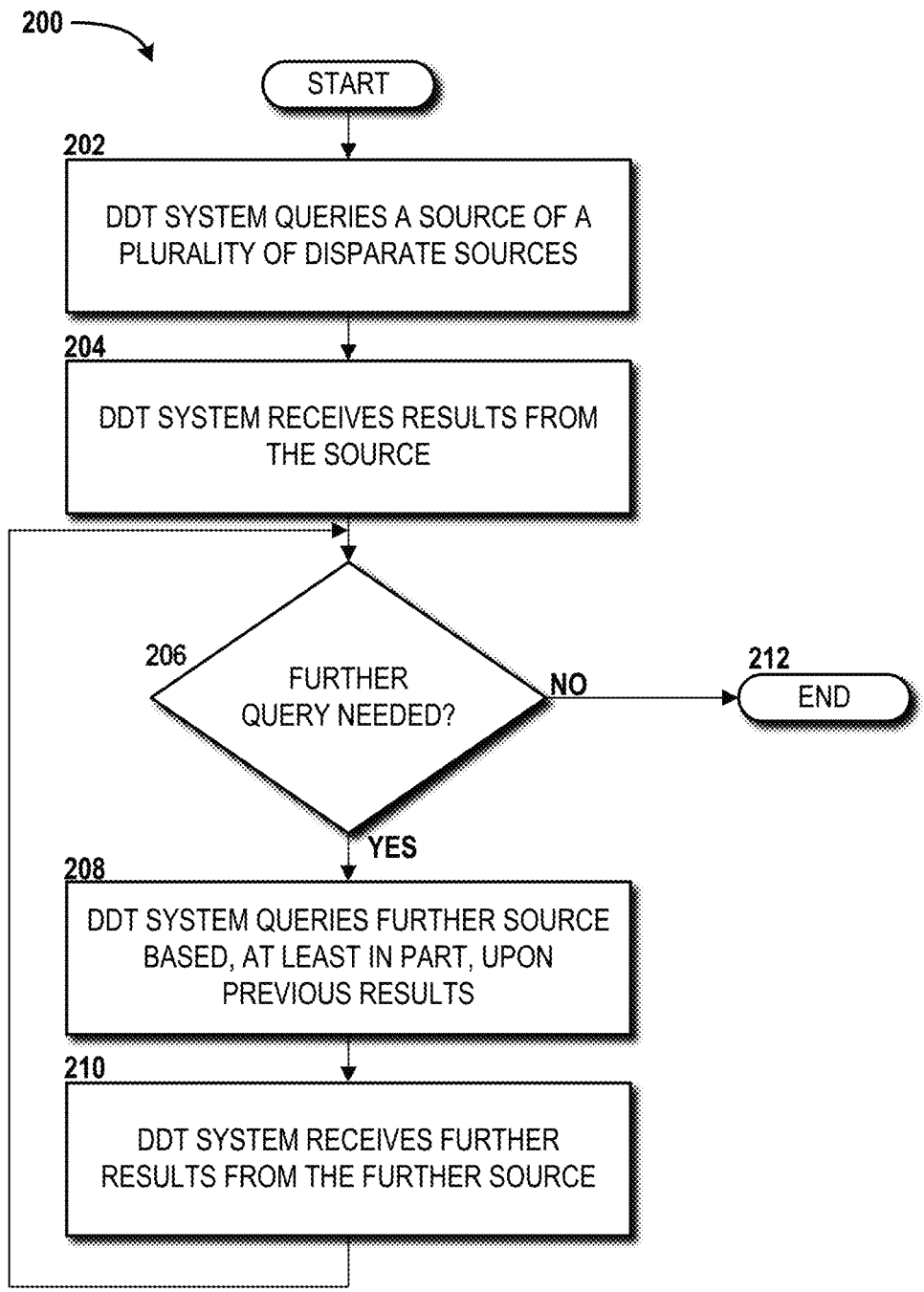
FIG. 2 is a flow diagram illustrating aspects of a method for creating semantic data threads for repeat use connecting a sequence of disparate sources, according to an illustrative embodiment.

Turning now to FIG. 2, aspects of a method 200 for creating semantic data threads for repeat use connecting a sequence of disparate sources, such as any combination of the sources 104 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the method 200 is described as being performed, at least in part, by the DDT system 102, and more particularly, by one or more processors (best shown in FIGS. 5-7) via execution of one or more software modules, such as those disclosed in FIG. 1. It should be understood that additional and/or alternative devices and/or network nodes can provide the functionality described herein via execution of one or more modules, applications, and/or other software. Thus, the illustrated embodiments are illustrative, and should not be viewed as being limiting in any way.

In today's IT environments, a complex solution (from phase 1 evaluation until deployment) might involve many APIs with no firm requirements (at least in phase 1) available that would allow multiple APIs to be stitched together to support a business function. For example, a typical cycle for an established project can include operations to identify candidate API(s) and/or database(s), to establish application interface design ("AID"), to write user story/tasks or high-level design ("HLD") based upon the AID and API definition, to code and unite tests using one or more simulators, to test any feature that typically requires database updates, to create a condition to trigger an API with expected values based upon upstream and/or downstream processes, and to resolve situations where a ticket or change request is created. The DDT system 102 speeds up the aforementioned processes by eliminating such bottlenecks allowing an end-to-end testing or evaluation of multiple systems that might be involved in implementation of a business function.

The method 200 will be described with reference to FIG. 2 and further reference to FIG. 1. The method 200 begins and proceeds to operation 202, where the DDT system 102 queries a source of the plurality of disparate sources 104. From operation 202, the method 200 proceeds to operation 204, where the DDT system 102 receives results 108 from the queried source. From operation 204, the method 200 proceeds to operation 206, where the DDT system 102 determines if a further query is needed based upon the results 108 received from the queried source. For a given semantic data thread, all steps are traversed until no values are available to pass to the next step and/or no input is available from the data correlation and machine learning module 114. If, at operation 206, the DDT system 102 determines that a further query is needed based upon the results 108 received from the queried source, the method 200 proceeds to operation 208, where the DDT system 102 queries a further source, such as another one of the sources 104, based, at least in part, upon the previous results. From operation 208, the method 200 proceeds to operation 210, where the DDT system 102 receives further results from the further source. From operation 210, the method 200 returns to operation 206, where the DDT system 102 determines if a further query is needed based upon the further results received from the further source. If no further query is needed, the method 200 proceeds to operation 212, where the method 200 ends. If a further query is needed, the method 200 returns to operation 208, and the method 200 proceeds as described above. In summary, the method 200 continues for as many of the sources 104 needed to be chained together.

Figure 3:
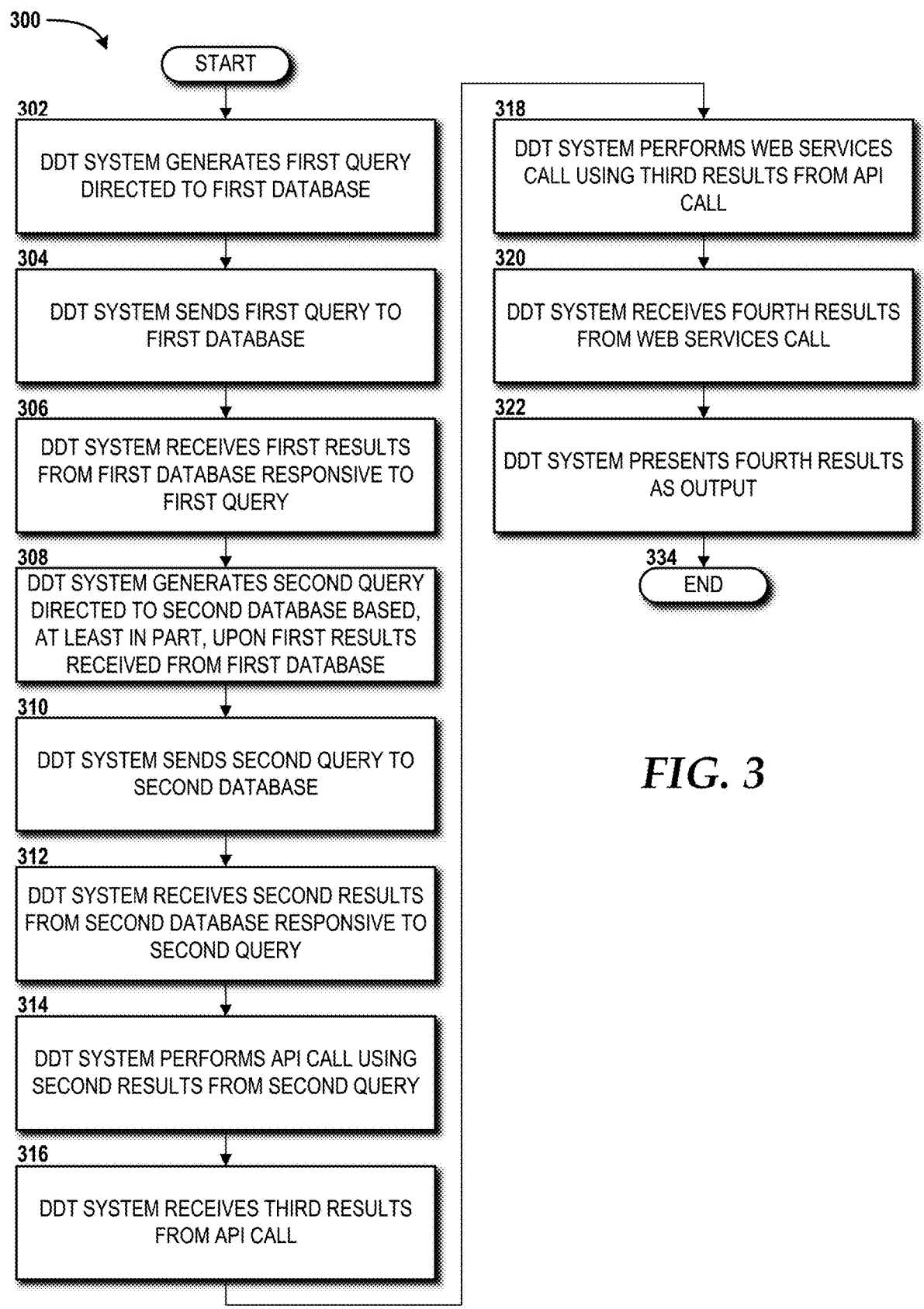
FIG. 3 is a flow diagram illustrating aspects of another method for creating semantic data threads for repeat use connecting a sequence of disparate sources, according to an illustrative embodiment.

Turning now to FIG. 3, another method 300 for creating semantic data threads for repeat use connecting a sequence of disparate sources will be described, according to an illustrative embodiment. The method 300 will be described with reference to FIG. 3 and additional reference to FIG. 1. For purposes of explaining the operation of the method 300, the source 104A will be referred to as a first database, the source 104B will be referred to as a second database, the source 104C will be referred to as an API, and the source 104N will be referred to as a web service. The queries 106A-106N will be referred to as first query, second query, third query, and fourth query, respectively; and similarly, the results 108A-108N will be referred to as first results, second results, third results, and fourth results, respectively. The sources 104, queries 106, and results 108 as referenced by the method 300 are only one example implementation of a specified source chain serviced by the DDT system 102. As such, the method 300 should not be described as being limiting in any way.

The method 300 begins and proceeds to operation 302, where the DDT system 102 generates a first query 106A directed to a first database 104A. From operation 302, the method 300 proceeds to operation 304, where the DDT system 102 sends the first query 106A to the first database 104A. From operation 304, the method 300 proceeds to operation 306, where the DDT system 102 receives first results 108A from the first database 104A responsive to the first query 106A.

From operation 306, the method 300 proceeds to operation 308, where the DDT system 102 generates a second query 106B directed to a second database 104B based, at least in part, upon the first results 108A received from the first database 104A. From operation 308, the method 300 proceeds to operation 310, where the DDT system 102 sends the second query 106B to the second database 104B. From operation 310, the method 300 proceeds to operation 312, where the DDT system 102 receives second results 108B from the second database 104B responsive to the second query 106B.

From operation 312, the method 300 proceeds to operation 314, where the DDT system 102 performs an API call 106C using the second results 108B from the second query 106B. From operation 314, the method 300 proceeds to operation 316, where the DDT system 102 receives third results 108C from the API call 106C.

From operation 316, the method 300 proceeds to operation 318, where the DDT system 102 performs a web services call 106N using the third results 108C from the API call 106C. From operation 318, the method 300 proceeds to operation 320, where the DDT system 102 receives fourth results 108N from the web services call 106N. From operation 320, the method 300 proceeds to operation 322, where the DDT system 102 presents the fourth results 108N as the output 128 to the output destination 130. From operation 322, the method 300 proceeds to operation 334, where the method 300 ends.

Figure 4:
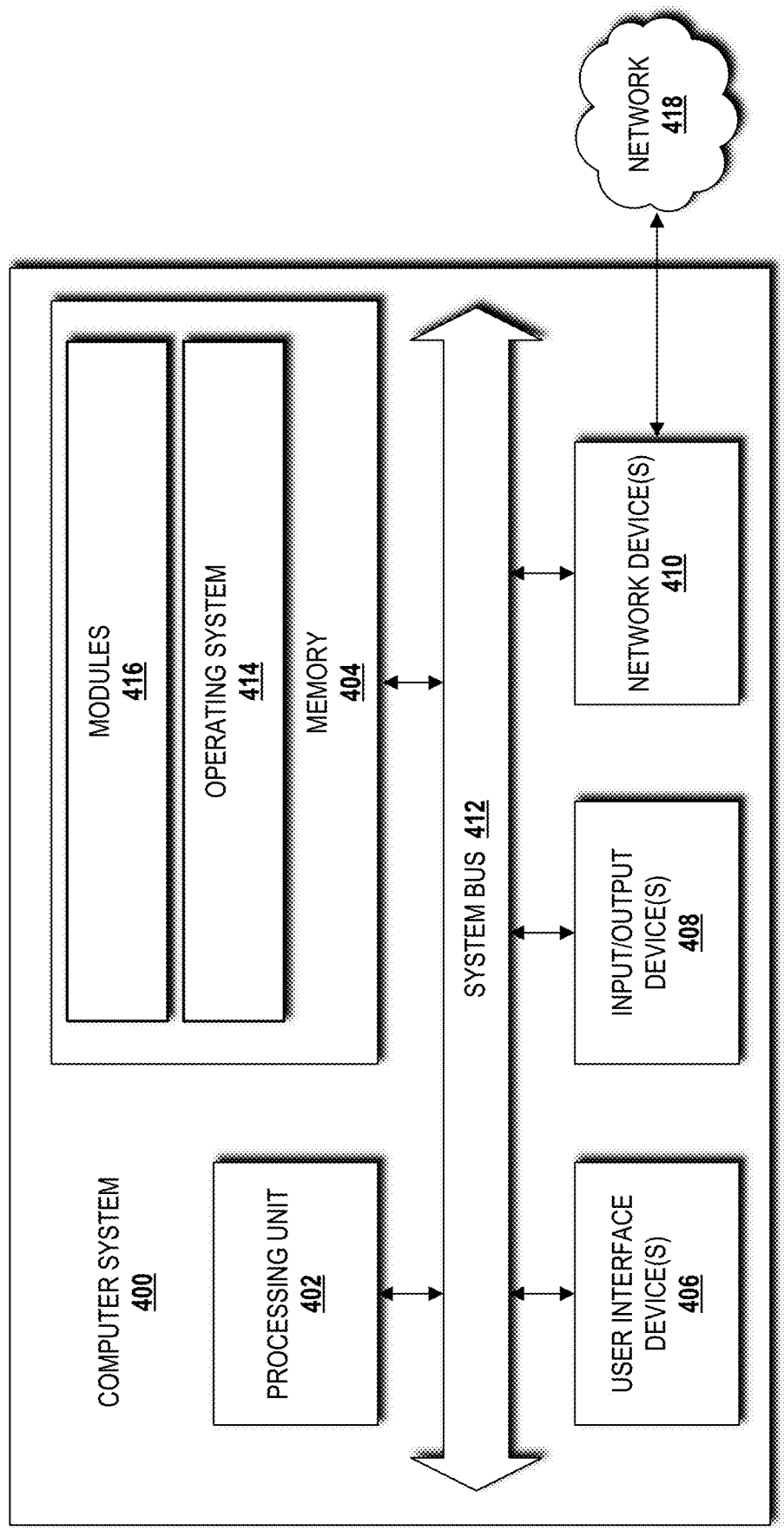
FIG. 4 is a block diagram illustrating an example computer system and components thereof capable of implementing aspects of the embodiments presented herein.

Turning now to FIG. 4, a block diagram illustrating a computer system 400 configured to provide the functionality in accordance with various embodiments of the concepts and technologies disclosed herein will be described. The systems, devices, and other components disclosed herein can utilize, at least in part, an architecture that is the same as or at least similar to the architecture of the computer system 400. For example, the DDT system 102, one or more of the sources 104, and/or the output destination 130 can utilize, at least in part, an architecture that is the same as or at least similar to the architecture of the computer system 400. It should be understood, however, that modification to the architecture may be made to facilitate certain interactions among elements described herein.

The computer system 400 includes a processing unit 402, a memory 404, one or more user interface devices 406, one or more I/O devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. The program modules 416 and/or other programs can be embodied in computer-readable media containing instructions that, when executed by the processing unit 402, perform various operations such as those described herein. According to embodiments, the program modules 416 may be embodied in hardware, software, firmware, or any combination thereof. The program modules 416 can include the data correlation and machine learning module 114, the user interface module 116, the scheduling module 118, the rendering module 120, the execution logic 122, the audit and monitoring module 124, and the plug-ins 126.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, personal digital assistant ("PDAs"), cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via a network 418. Examples of the network devices 410 include, but are not limited to, a modem, a radio frequency ("RF") or infrared ("IR") transceiver, a telephonic interface, a bridge, a router, or a network card. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 418 may be or may include a wired network such as, but not limited to, a Wide Area Network ("WAN"), a wired Personal Area Network ("PAN"), or a wired Metropolitan Area Network ("MAN"). The network 418 can be or can include the Internet 104, or any other network or combination of networks described herein.

Figure 5:
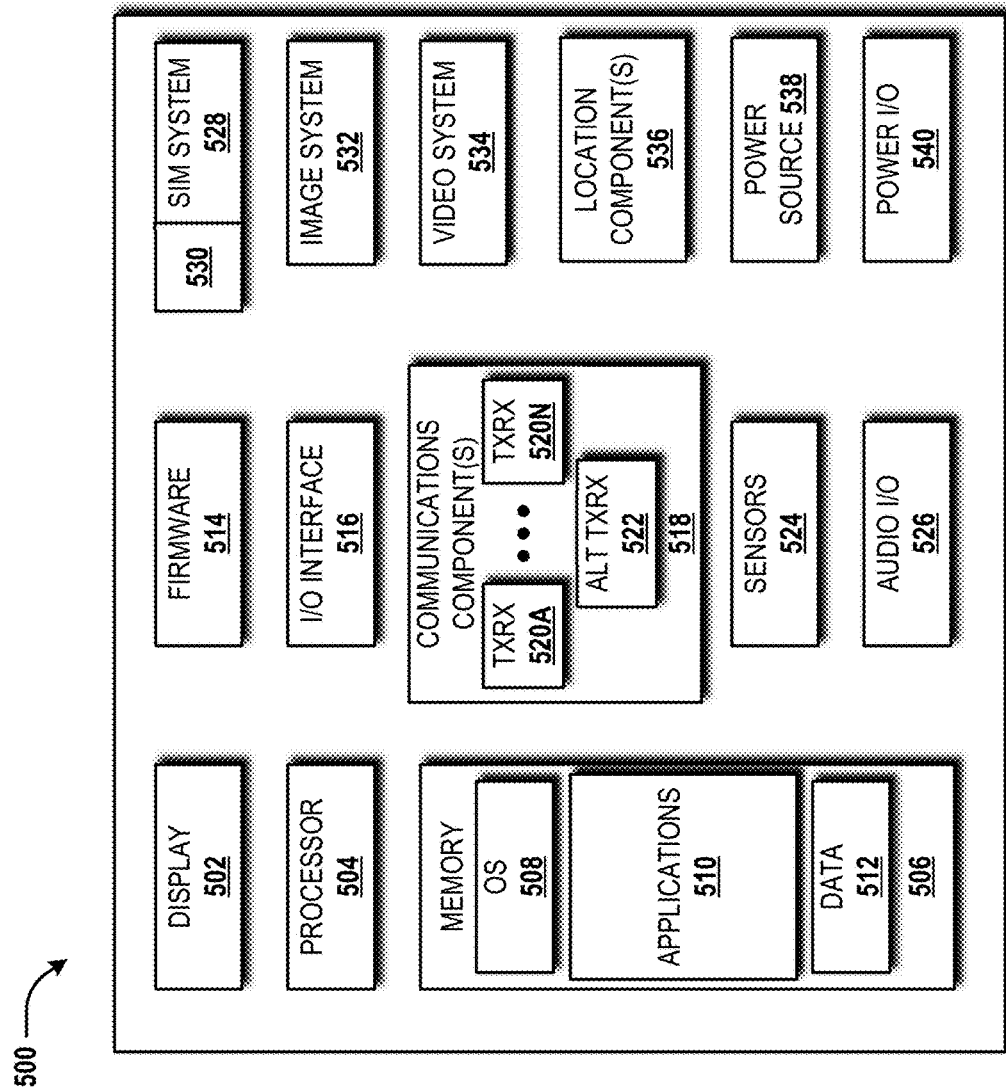
FIG. 5 is a block diagram illustrating an example mobile device and components thereof capable of implementing aspects of the embodiments presented herein.

Turning now to FIG. 5, an illustrative mobile device 500 and components thereof will be described. In some embodiments, the DDT system 102, one or more of the sources 104, and/or the output destination 130 can be configured like the mobile device 500. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UP") application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in viewing conference media, entering content, viewing account information, answering/initiating calls, entering/deleting data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like.

The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as universal serial bus ("USB") port, a mini-USB port, a micro-USB port, an audio jack, a PS2 port, an Institute of Electrical and Electronics Engineers ("IEEE") 1394 ("FIREWIRE") port, a serial port, a parallel port, an Ethernet (RJ45) port, an RJ10 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using GSM, CDMA ONE, CDMA2000, LTE, and various other 2G, 2.5G, 3G, 4G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
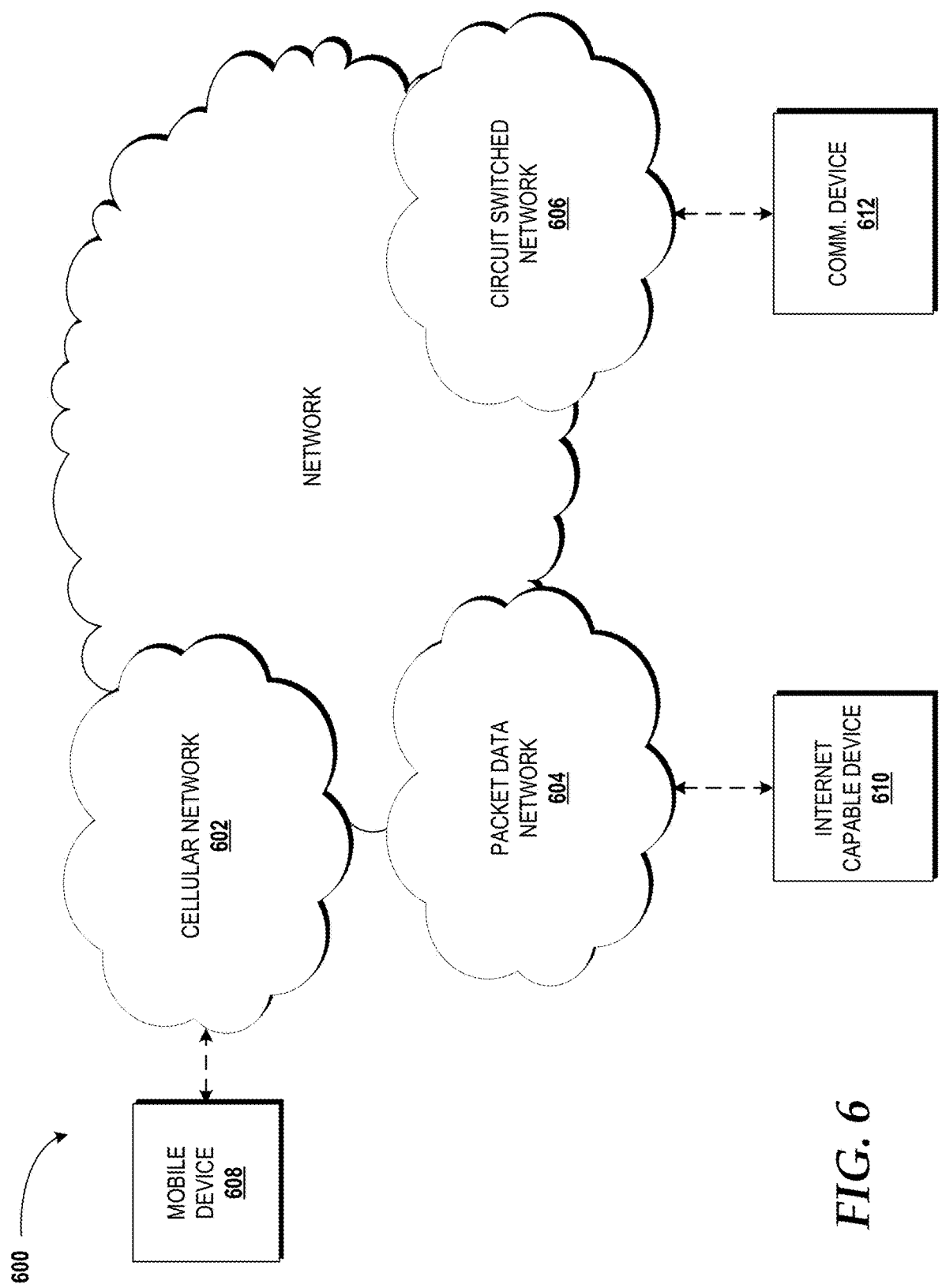
FIG. 6 is a block diagram illustrating an example network capable of implementing aspects of the embodiments presented herein.

Turning now to FIG. 6, details of a network 600 are illustrated, according to an illustrative embodiment. The network 600 includes a cellular network 602, a packet data network 604, and a circuit switched network 606, for example, a publicly switched telephone network ("PSTN").

The cellular network 602 includes various components such as, but not limited to, base transceiver stations ("BTSs"), nodeBs ("NBs"), eNBs, base station controllers ("BSCs"), radio network controllers ("RNCs"), mobile switching centers ("MSCs"), MMES, SGWs, PGWs, short message service centers ("SMSCs"), multimedia messaging service centers ("MMSCs"), home location registers ("HLRs"), home subscriber servers ("HS Ss"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 600 is used to refer broadly to any combination of the networks 602, 604, 606. It should be appreciated that substantially all of the functionality described with reference to the network 600 can be performed by the cellular network 602, the packet data network 604, and/or the circuit switched network 606, alone or in combination with other networks, network elements, and the like.

Turning now to FIG. 7, a distributed computing environment 700 will be described, according to an exemplary embodiment. The architecture of the distributed computing environment 700 can be utilized to implement various elements disclosed herein, including, for example, the DDT system 102. The distributed computing environment 700 is a shared infrastructure that can support multiple services and network applications. The illustrated distributed computing environment 700 includes a hardware resource layer 702, a virtualization/control layer 704, and a virtual resource layer 706 that work together to perform operations as will be described in detail herein.

The hardware resource layer 702 provides hardware resources, which, in the illustrated embodiment, include one or more compute resources 708, one or more memory resources 710, and one or more other resources 712. The compute resource(s) 708 can include one or more hardware components that perform computations to process data, and/or to execute computer-executable instructions of one or more application programs, operating systems, and/or other software. The compute resources 708 can include one or more central processing units ("CPUs") configured with one or more processing cores. The compute resources 708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 708 can include one or more discrete GPUs. In some other embodiments, the compute resources 708 can include CPU and GPU components that are configured in accordance with a co-processing CPU/GPU computing model, wherein the sequential part of an application executes on the CPU and the computationally-intensive part is accelerated by the GPU. The compute resources 708 can include one or more system-on-chip ("SoC") components along with one or more other components, including, for example, one or more of the memory resources 710, and/or one or more of the other resources 712. In some embodiments, the compute resources 708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 708 can be or can include one or more hardware components architected in accordance with an advanced reduced instruction set computing ("RISC") ("ARM") architecture, available for license from ARM HOLDINGS of Cambridge, United Kingdom. Alternatively, the compute resources 708 can be or can include one or more hardware components architected in accordance with an x86 architecture, such an architecture available from INTEL CORPORATION of Mountain View, Calif., and others. Those skilled in the art will appreciate the implementation of the compute resources 708 can utilize various computation architectures, and as such, the compute resources 708 should not be construed as being limited to any particular computation architecture or combination of computation architectures, including those explicitly disclosed herein.

The memory resource(s) 710 can include one or more hardware components that perform storage operations, including temporary or permanent storage operations. In some embodiments, the memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 708.

The other resource(s) 712 can include any other hardware resources that can be utilized by the compute resources(s) 708 and/or the memory resource(s) 710 to perform operations described herein. The other resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 702 can be virtualized by one or more virtual machine monitors ("VMMs") 714A-714K (also known as "hypervisors"; hereinafter "VMMs 714") operating within the virtualization/control layer 704 to manage one or more virtual resources that reside in the virtual resource layer 706. The VMMs 714 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as VMs. In the illustrated embodiment, the virtual resource layer 706 includes VMs 716A-716N (hereinafter "VMs 716"). Each of the VMs 716 can execute one or more applications to perform the operations described herein.

Based on the foregoing, it should be appreciated that concepts and technologies directed to a DDT system have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A dynamic data threading system comprising:
   a processor; and
   a memory having instructions stored thereon that, when executed by the processor, cause the processor to perform operations comprising
      querying a source of a plurality of disparate sources,
      receiving results from the source,
      determining, based upon the results, whether a further query is needed,
      in response to determining that the further query is needed,
         querying a further source of the plurality of disparate sources based, at least in part, upon the results received from the source, and
         receiving further results from the further source, and
      creating a semantic data thread through at least the source and the further source, wherein an output of the semantic data thread comprises a known output type, and wherein the semantic data thread is reusable to obtain the known output type.

2. The dynamic data threading system of claim 1, wherein the operations further comprise:
   determining, based upon the further results, whether a still further query is needed; and
   in response to determining that the still further query is needed,
      querying a still further source of the plurality of disparate sources based, at least in part, upon the further results received from the further source, and
      receiving still further results from the still further source,
   wherein creating the semantic data thread comprises creating the semantic data thread through at least the source, the further source, and the still further source.

3. The dynamic data threading system of claim 2, wherein the source comprises a database, the further source comprises an application programming interface, and the still further source comprises a web service.

4. The dynamic data threading system of claim 1, wherein the operations further comprise sending the output to an output destination.

5. The dynamic data threading system of claim 4, wherein the output destination comprises an artificial intelligence system or a machine learning system.

6. The dynamic data threading system of claim 4, wherein sending the output to the output destination comprises sending the output to the output destination in a plurality of formats.

7. The dynamic data threading system of claim 1, wherein the plurality of disparate sources comprise a database, an application programming interface, and a web service.

8. A method comprising:
querying, by a dynamic data threading system comprising a processor, a source of a plurality of disparate sources;
receiving, by the dynamic data threading system, results from the source;
determining, by the dynamic data threading system, based upon the results, whether a further query is needed;
in response to determining that the further query is needed,
  querying, by the dynamic data threading system, a further source of the plurality of disparate sources based, at least in part, upon the results received from the source, and
  receiving, by the dynamic data threading system, further results from the further source; and
creating, by the dynamic data threading system, a semantic data thread through at least the source and the further source, wherein an output of the semantic data thread comprises a known output type, and wherein the semantic data thread is reusable to obtain the known output type.

9. The method of claim 8, further comprising:
determining, by the dynamic data threading system, based upon the further results, whether a still further query is needed; and
in response to determining that the still further query is needed,
  querying, by the dynamic data threading system, a still further source of the plurality of disparate sources based, at least in part, upon the further results received from the further source, and
  receiving, by the dynamic data threading system, still further results from the still further source,
wherein creating the semantic data thread comprises creating the semantic data thread through at least the source, the further source, and the still further source.

10. The method of claim 9, wherein the source comprises a database, the further source comprises an application programming interface, and the still further source comprises a web service.

11. The method of claim 8, further comprising sending the output to an output destination.

12. The method of claim 11, wherein the output destination comprises an artificial intelligence system or a machine learning system.

13. The method of claim 11, wherein sending the output to the output destination comprises sending the output to the output destination in a plurality of formats.

14. The method of claim 8, wherein the plurality of disparate sources comprise a database, an application programming interface, and a web service.

15. A computer-readable storage medium having computer-executable instructions stored thereon that, when executed by a processor, cause the processor to perform operations comprising:
querying a source of a plurality of disparate sources;
receiving results from the source;
determining, based upon the results, whether a further query is needed;
in response to determining that the further query is needed,
  querying a further source of the plurality of disparate sources based, at least in part, upon the results received from the source, and
  receiving further results from the further source; and
creating a semantic data thread through at least the source and the further source, wherein an output of the semantic data thread comprises a known output type, and wherein the semantic data thread is reusable to obtain the known output type.

16. The computer-readable storage medium of claim 15, wherein the operations further comprise:
determining, based upon the further results, whether a still further query is needed; and
in response to determining that the still further query is needed,
  querying a still further source of the plurality of disparate sources based, at least in part, upon the further results received from the further source, and
  receiving still further results from the still further source,
wherein creating the semantic data thread comprises creating the semantic data thread through at least the source, the further source, and the still further source.

17. The computer-readable storage medium of claim 16, wherein the source comprises a database, the further source comprises an application programming interface, and the still further source comprises a web service.

18. The computer-readable storage medium of claim 15, wherein the operations further comprise sending the output to an output destination.

19. The computer-readable storage medium of claim 18, wherein the output destination comprises an artificial intelligence system or a machine learning system.

20. The computer-readable storage medium of claim 15, wherein the plurality of disparate sources comprise a database, an application programming interface, and a web service.

* * * * *